United States Patent [19]

Armstrong et al.

[11] 4,315,313

[45] Feb. 9, 1982

[54] DIAGNOSTIC CIRCUITRY IN A DATA PROCESSOR

[75] Inventors: Rolfe D. Armstrong, Escondido; Dennis A. Walsh, San Marcos, both of Calif.

[73] Assignee: NCR Corporation, Dayton, Ohio

[21] Appl. No.: 107,735

[22] Filed: Dec. 27, 1979

[51] Int. Cl.³ .............................................. G06F 11/00
[52] U.S. Cl. ..................................... 364/200; 371/16; 371/19
[58] Field of Search ... 364/200 MS File, 900 MS File; 371/12, 16, 19

[56] References Cited

U.S. PATENT DOCUMENTS

| | | | |
|---|---|---|---|
| 3,213,427 | 10/1965 | Schmitt et al. | 364/200 |
| 3,396,371 | 8/1968 | Waldecker | 364/200 |
| 3,540,003 | 11/1970 | Murphy | 364/200 |
| 3,659,272 | 4/1972 | Price et al. | 364/200 |
| 3,696,340 | 10/1972 | Matsushita et al. | 364/200 |
| 3,736,566 | 5/1973 | Anderson et al. | 364/200 |
| 3,771,131 | 11/1973 | Ling | 364/200 |
| 3,889,243 | 6/1975 | Drimak | 364/200 |
| 3,937,938 | 2/1976 | Matthews | 364/200 |
| 4,016,543 | 4/1977 | Franks et al. | 364/200 |
| 4,176,394 | 11/1979 | Kaminski et al. | 364/200 |

OTHER PUBLICATIONS

Birney et al., "Save Storage Address on Error Class Interrupts", in IBM Tech. Discl. Bull., vol. 19, No. 11, Apr. 1977, pp. 4062-4068.

Primary Examiner—Joseph M. Thesz
Assistant Examiner—Eddie P. Chan
Attorney, Agent, or Firm—J. T. Cavender; Edward Dugas; Stephen F. Jewett

[57] ABSTRACT

Diagnostic circuitry for use with the processor of a data processing system. The diagnostic circuitry includes a control register execution log for receiving control store addresses from a control register associated with an "EXECUTE+1" stage. A log pointer addresses the log when control store addresses are written into or read from the log. Test registers connected to the log and log pointer provide control store addresses and decrementing log addresses when the contents of the log are examined. One of the test registers is also used to hold a control store address for comparison with control store addresses of executing microinstructions, and when a match occurs, to generate a $\overline{SYNC}$ signal.

6 Claims, 11 Drawing Figures

DIAGNOSTIC CIRCUITRY IN A DATA PROCESSOR

BACKGROUND OF THE INVENTION

The present invention relates to diagnosing errors in data processing systems and, more particularly, to diagnostic circuitry for use in diagnosing errors in the processor of a data processing system.

There have been proposed in the past a number of approaches for use in diagnosing operational errors in the processor of a data processing system. For example, in U.S. Pat. No. 4,253,183, issued to Allen G. Taylor et al., there is provided circuitry for recording signals or test data at various test points in a processor in response to a snapshot command. The signals or test data are used, for example, by a field engineer in order to analyze the operation of the processor.

Other approaches have been proposed in the past for recording data generated during the operation of the processor, such data being generated in response to a diagnostic command or being generated during the performance of actual tasks by the processor. Furthermore, it has been known in the past to provide diagnostic circuitry for stopping the operation of a processor at the occurrence of a specified command, as illustrated in U.S. Pat. No. 4,048,671, issued to Robert W. Callahan, et al.

While the incorporation of diagnostic circuitry in a processor to aid in later diagnosis by a field engineer has been known, such diagnostic circuitry often increases the cost of manufacturing the processor. Furthermore, a number of different diagnostic operations may be desirable when a field engineer services a processor, and to incorporate circuitry for accomplishing each of these diagnostic operations often consumes processor components and space which might be better used by the processor to carry out normal processor functions or operations.

There has, accordingly, arisen a need for diagnostic circuitry for use with a data processor that is relatively simple and inexpensive, but that can be used by a field engineer to carry out a number of important diagnostic operations.

SUMMARY OF THE INVENTION

There is provided in accordance with the present invention diagnostic circuitry having a control register execution log for storing the control store addresses of microinstructions that are operated on or executed in the processor of a data processing system. The execution log is connected to the processor in order to eliminate the need for memory space external to the diagnostic circuitry and the necessary connections to such external memory space.

There is further provided in accordance with the present invention a control register associated with each stage of the processor, the control register holding or storing the control store address of the microinstruction in its associated stage. A stage subsequent to the execute stage of the processor is provided, such stage being referred to as the "EXECUTE+1" stage and having its own control register. The "EXECUTE+1" control register is connected to the execution log so that the execution log receives the control store addresses of each microinstruction after being executed.

A log pointer, implemented by a counter/register in the illustrated embodiment, is connected to the addressing input of the execution log. When the processor is executing microinstructions and it is desired to have a record or history of the executed microinstructions, the log pointer is incremented to sequentially address storage locations in the execution log in order to store the control store addresses from the "EXECUTE+1" control register.

The log pointer can receive a log address in order to read from the log the control store address stored at that specific log address. In addition, first and second test registers are provided to receive at their parallel data inputs a control store address stored in the execution log and the corresponding log address in the log pointer, respectively. The serial outputs of the test registers are so connected that the control store address from the log and the log address from the log pointer may be serially shifted out of the test registers to an external serial data output of the diagnostic circuitry.

There is further provided a compare circuit for receiving a specified control store address provided at an external serial data input of the diagnostic circuitry and for receiving the control store address stored in the control register associated with the execute stage of the processor. When the compare circuit indicates a match of the specified control store address and the control store address in the execute stage, a $\overline{\text{SYNC}}$ signal is generated and can be used to stop the processor or to trigger an oscilloscope to display waveforms at selected test points in the processor.

A multiplexer is provided so that the second test register may either store the specified control store address from the external serial data input or receive or circulate data from the first test register as data is shifted through the registers to the external serial data output of the diagnostic circuitry.

DETAILED DESCRIPTION OF THE PREFERRED EMBODIMENT

Figure 1A:
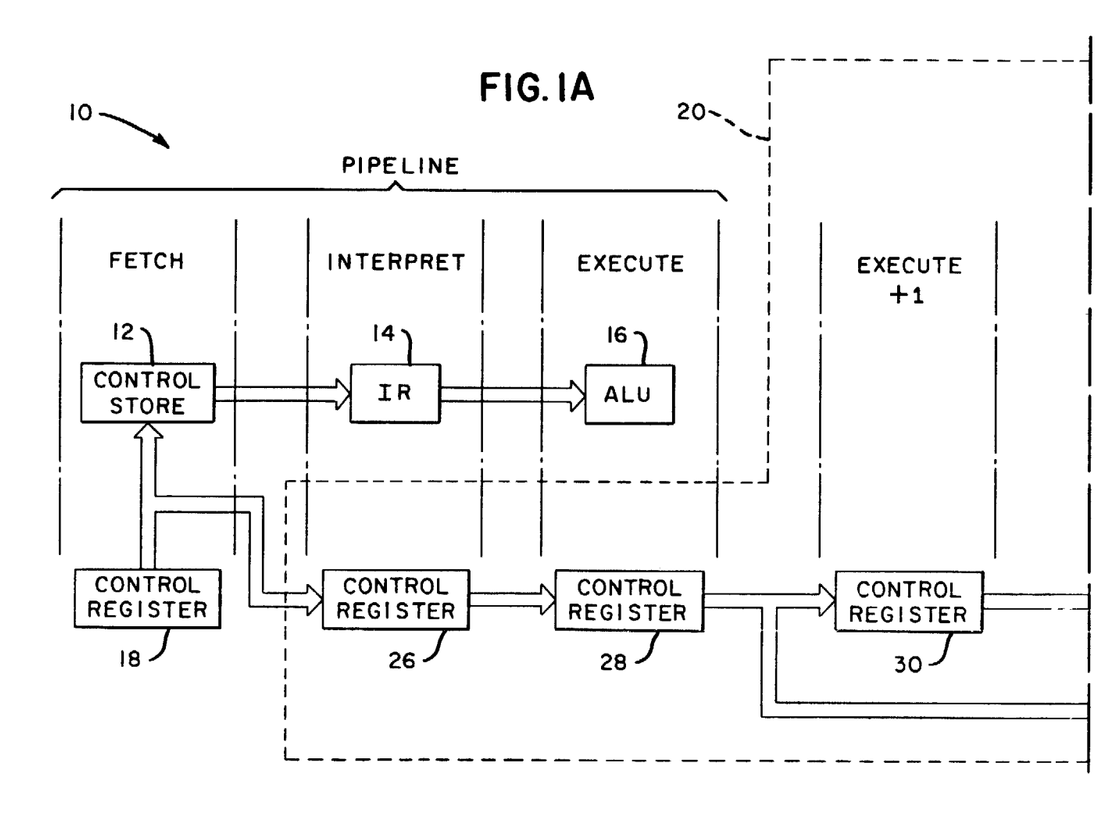
FIGS. 1A and 1B are a simplified block diagram of a data processor to which diagnostic circuitry is connected in accordance with the present invention.
Figure 1B:
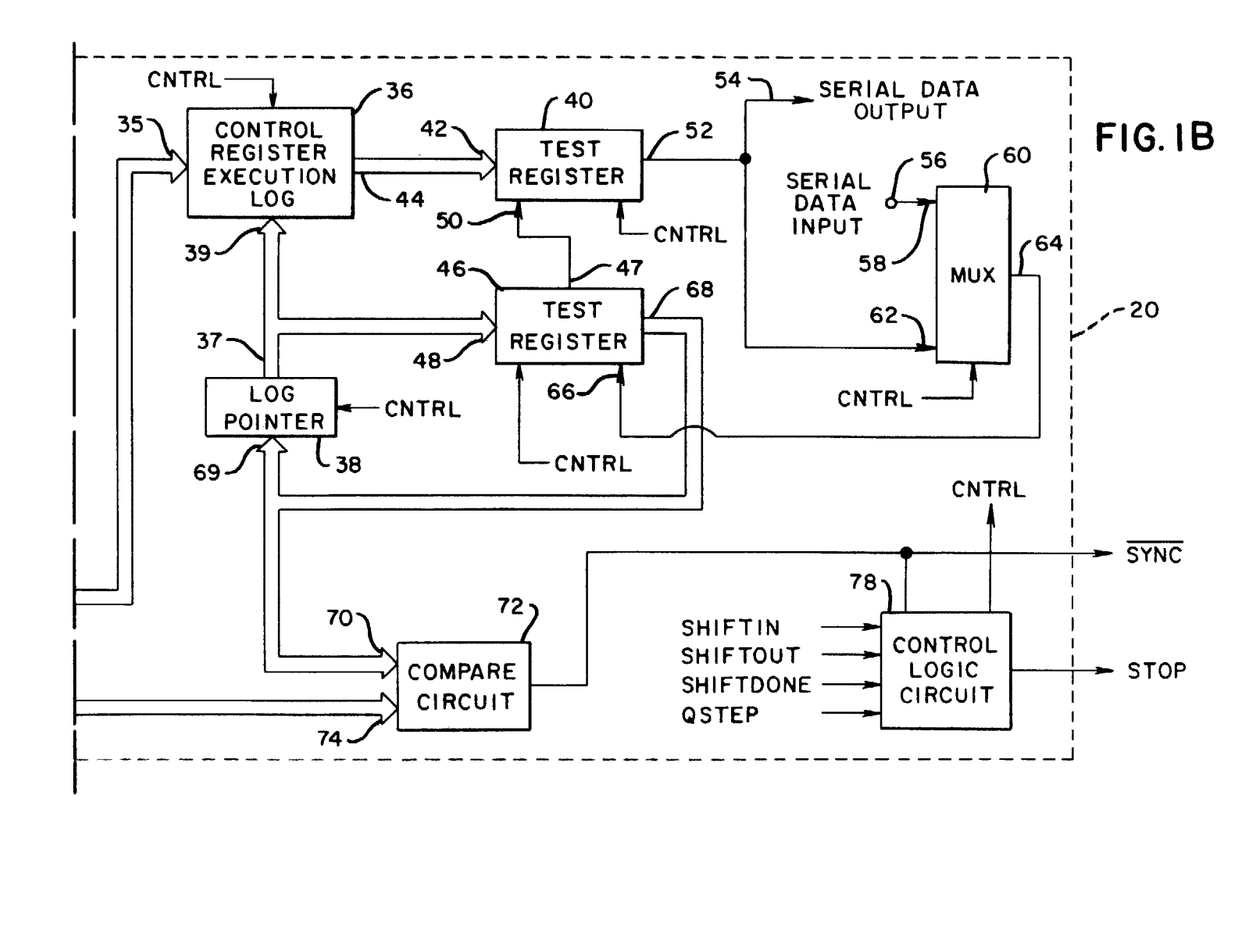

Turning now to FIGS. 1A and 1B, there is shown in simplified block form a processor 10 of a conventional data processing system. The processor 10 has a so-called pipeline architecture and includes a FETCH stage, an INTERPRET stage and an EXECUTE stage. The FETCH stage can include a control store 12 that stores a plurality of microinstructions used by the processor during the execution of a computer program. The INTERPRET stage can include an instruction register (IR) 14 and suitable decoding circuitry (not shown) for interpreting and decoding each microinstruction provided by the FETCH stage. The EXECUTE stage can include an ALU 16 and other circuitry for performing any arithmetic or logic operations necessary to execute each microinstruction interpreted by the INTERPRET stage. A control register 18 is associated with the FETCH stage. The control register 18 holds a control store address and provides that control store address to the control store 12 in order to access each microinstruction to be executed by the processor. The processor 10 as thus far described is conventional.

In order to diagnose any operational errors in the processor 10, there is provided, in accordance with the present invention, diagnostic circuitry 20 operatively connected to the processor 10. Among other things, the diagnostic circuitry 20 will provide a history or record of signals relating to or identifying the microinstructions executed by the processor 10.

As seen in FIG. 1A, the diagnostic circuitry 20 includes an INTERPRET control register 26, an EXECUTE control register 28 and an "EXECUTE+1" control register 30. The control registers 26, 28 and 30 are connected for receiving, in a sequential fashion, each control store address from the control register 18 so that each control store address follows its associated microinstruction through each of the stages in the processor 10. Accordingly, the control register 26 stores the control store address of the microinstruction passing through the INTERPRET stage of the processor 10, and the control register 28 stores the same control store address when that microinstruction reaches the EXECUTE stage. After that microinstruction is executed, the same control store address is then provided to the control register 30. Since the control register 30 receives each control store address after its associated microinstruction has been executed, it is, for the purposes of the present description, shown as being located in the stage identified as "EXECUTE+1."

To record the control store addresses of microinstructions executed in the processor 10, there is provided a control register execution log 36 (FIG. 1B). The control register execution log 36 has a plurality of storage locations for storing each control store address received at its data input 35 from the control register 30. The log 36 is addressed by log address bits at the output 37 of a log pointer 38, provided to an address input 39 of the log. The log pointer 38 increments each time a microinstruction is executed in the processor 10 in order to sequentially address the log 36 and thereby store each control store address from the control register 30 in the log 36.

The connection of the log 36 so that it receives control store addresses from the EXECUTE+1 control register 30, rather than, say, the EXECUTE control register 28, is important in properly diagnosing any errors in the processor 10. During the course of the operation of the processor, there may be the execution of a conventional jump instruction that would interrupt or change the flow of control store addresses in the control registers 18, 26 and 28. In such a circumstance, the control store address that enters the EXECUTE control register 28 may be changed or aborted and may not, in fact, represent the microinstruction that stays in the EXECUTE stage for execution. Accordingly, the EXECUTE+1 stage is provided having the control register 30 for receiving only the control store addresses from the EXECUTE control register 28 that represent microinstructions actually executed. A true record of only the microinstructions actually executed is thereby maintained by the log 36.

As will be described in greater detail later, the log pointer 38 not only addresses the log 36 during normal processor operations in order to store or write control store addresses from the control register 30, but also addresses the log in order to read the control store addresses from the log 36 when needed for diagnostic purposes. The log 36 is a LIFO (last-in-first-out) memory, and the log pointer decrements as each control store address is read out. The log pointer 38 may be used to begin reading either from the last address written into the log and pointed to by the log pointer 38, or from any log address externally provided to the log pointer 38.

As further seen in FIG. 1B, there is a first test register 40 connected for receiving at its parallel data input 42 the bits in a control store address provided at the output 44 of the log 36. A second test register 46 is likewise connected for receiving at its parallel data input 48 the bits of the log address provided at the output 37 of the log pointer 38. The second test register 46 has a serial output 47 connected to a serial input 50 of the test register 40. The test register 40 has its serial output 52 connected for serially providing the contents of the test register 40 and the test register 46 to an external serial data output 54 of the diagnostic circuitry 20.

An external serial data input 56 of the diagnostic circuitry 20 is connected to one input 58 of a multiplexer (MUX) 60. The other input 62 of MUX 60 is connected to the serial output 52 of test register 40. The output 64 of MUX 60 is connected to a serial input 66 of the test register 46.

A parallel data output 68 of the test register 46 is connected to a parallel data input 69 of the log pointer 38, and to one set of inputs 70 of a compare circuit 72. The compare circuit 72 has its other set of inputs 74 connected to receive the control store address from the EXECUTE control register 28. As will be more fully described later, the compare circuit 72 provides a SYNC signal at its output when a specified microinstruction is executed in the processor. The $\overline{\text{SYNC}}$ signal can be used, for example, to trigger an oscilloscope or to stop the operation of the processor 10.

In order to control the operation of the diagnostic circuitry 20, a control logic circuit 78 is provided. The control logic circuit 78 can, for example, receive the $\overline{\text{SYNC}}$ signal and in response generate a stop signal to stop the processor 10. The control logic circuit 78 can also receive a SHIFTIN signal for causing data to be shifted into the test registers 40 and 46 from the serial data input 56, a SHIFTOUT signal to shift data out of the test registers 40 and 46 to the serial data output 54, a SHIFTDONE signal to move data from the test register 46 into the log pointer 38, and a QSTEP signal which goes to a high or "1" logic level when the processor is stopped.

As illustrated diagrammatically in FIG. 1B, and as will be more fully described later in conjunction with FIGS. 2A–2I, control circuit 78 provides control (CNTRL) signals to control the operation of the other components of the diagnostic circuitry 20.

Much of the diagnostic circuitry 20, such as the EXECUTE+1 control register 30 in FIG. 1A and all of the circuit components in FIG. 1B, are used only in diagnostic operations and not during normal processor operations. Accordingly, such circuitry could be part of a diagnostic module plugged into the processor 10 only when, for example, a field engineer wants to diagnose errors in the processor.

The diagnostic circuitry 20 in FIGS. 1A and 1B can be used in performing five basic diagnostic operations. These operations are described in detail below.

1. STORE CONTROL STORE ADDRESSES IN LOG 36

During normal operation of the processor 10, log 36 can be used to record or store the control store address of each microinstruction that is fully executed in the EXECUTE stage of the processor. Such control store addresses are provided by the EXECUTE+1 control register 30 to the log 36, and are stored in the log 36 at each storage location addressed or pointed to by the log pointer 38. The log pointer 38 increments with the execution of each microinstruction, so that sequential storage locations in the log 36 are addressed as the control store addresses are provided to the log 36 from the control register 30. During the normal operation of the processor 10, the QSTEP, SHIFTIN, SHIFTOUT and SHIFTDONE signals at the control logic circuit 78 are all at a low or "0" logic level.

2. GENERATION OF THE $\overline{SYNC}$ SIGNAL

The $\overline{SYNC}$ signal can be generated at the execution of any preselected microinstruction. For example, if a field engineer diagnosing the processor would like to monitor the signal levels at test points in the processor after the execution of the microinstruction, the $\overline{SYNC}$ signal can be used to trigger an oscilloscope having its probes connected to display the waveforms of the signals at those test points. The value of a specified control store address of the microinstruction whose execution is desired to generate the $\overline{SYNC}$ signal is first provided to the diagnostic circuitry 20 at the serial data input 56 (FIG. 1B). The SHIFTIN signal at control logic circuit 78 goes high, generating the appropriate control signals to pass the value of the control store address at the serial data input 56 through MUX 60 and to cause the control store address to be shifted into the test register 46. The control store address value then appears at the parallel data output 68 of test register 46. When the microinstruction which is to cause the generation of the SYNC signal reaches in the EXECUTE control register 28, indicating that the microinstruction is being executed in the EXECUTE stage of the processor, the compare circuit 72 senses a match of the control store address values in the test register 46 and in the EXECUTE control register 28, and the $\overline{SYNC}$ signal is generated at the output of the compare circuit.

3. GENERATION OF A STOP SIGNAL

In some cases, a field engineer may want to stop the operation of the processor at some given point, for example, to check the contents of the log 36. In order to generate the STOP signal, the $\overline{SYNC}$ signal is first generated at a desired microinstruction in the manner described above. The $\overline{SYNC}$ signal at the output of compare circuit 72 is then provided to the control logic circuit 78. In response, the control logic circuit 78 generates the STOP signal which can be used, for example, by employing conventional logic gates, to block delivery of the processor clock to each of the processor stages and thereby prevent the processor from executing any further microinstructions. When the processor is stopped, the QSTEP signal delivered to control logic circuit 78 goes high.

4. READ CONTROL STORE ADDRESSES FROM LOG 36

The control store addresses in the log 36 can be read when diagnosing errors in order to determine whether the processor has executed the proper sequence of microinstructions. The log 36 is a LIFO memory and it can be read by beginning at the last log address pointed to by the log pointer 38 and decrementing that address until all or as many control store addresses as are needed have been read. The SHIFTOUT signal at control logic circuit 78 goes high, causing the "top" or last control store address, which is in test register 40, and the log address associated with that control store address, which is in the test register 46, to be serially shifted through the test registers to the serial data output 54. At the end of the shifting, the SHIFTOUT signal at the control logic circuit 78 goes low, causing the log pointer 38 to decrement, and the test register 46 to be loaded with the new log address from the log pointer and the test register 40 to be loaded with the new control address at the new log address in the log 36. This is repeated until the desired number of control register addresses from the log 36 have been read.

The serial data output 54 can be connected to a monitor (not shown), such as a CRT display. The display would show, of course, both the value of each control store address from the log, as well as the decrementing log addresses from the log pointer 38. Displaying the decrementing log addresses is a significant advantage in diagnosing for errors, since the field engineer looking at the display can be assured that consecutive, identical control store addresses appearing at the display indicate a problem with the processor, and is not caused by the log pointer failing to increment or decrement.

In the preferred embodiment shown, the control store address and associated log address shifted out of test registers 40 and 46 to the serial output 54 are also passed through MUX 60 back into test registers 40 and 46. This permits the SHIFTOUT signal to be used to read out test registers in the processor or system other than test registers 40 and 46. If those other test registers are being read, the contents of the registers 40 and 46 are saved and they can be read out later by a subsequent SHIFTOUT signal.

5. SELECTING A STORAGE LOCATION IN THE LOG 30 TO BE READ

If it is desired to select a storage location in the log 36 from which a control store address is to be read, a log address can be provided to the log pointer 38. The SHIFTIN signal at control logic circuit 78 goes high in order to cause a log address provided at the serial data input 56 to be shifted into the test register 46 by way of the MUX 60. After the log address is received in the test register 46, the SHIFTDONE signal at the control logic circuit 78 goes high, causing the bits in test register 46 at its parallel output 68 to be loaded into the log pointer 38. The control store address at the log address in the log pointer is provided to the test register 40. In order to read the log, the SHIFTOUT signal goes high, causing the bits in test registers 40 and 46 to be shifted out at the serial data output 54, as described earlier. The log pointer decrements, and the test register 40 is loaded with the new control store address at the new log address. This is repeated until the desired number of control store addresses have been read from the log 36.

Figure 2:
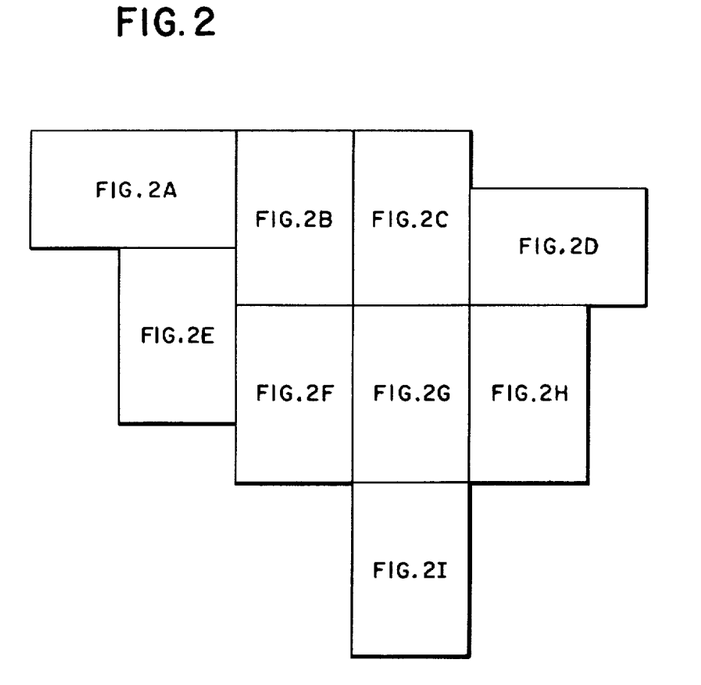
FIG. 2 illustrates the relationship of FIGS. 2A through 2I.

FIG. 2 shows the relationship of FIGS. 2A-2I, and FIGS. 2A-2I show specific circuitry components for implementing the diagnostic circuitry 20 of FIGS. 1A and 1B.

Figure 2A:
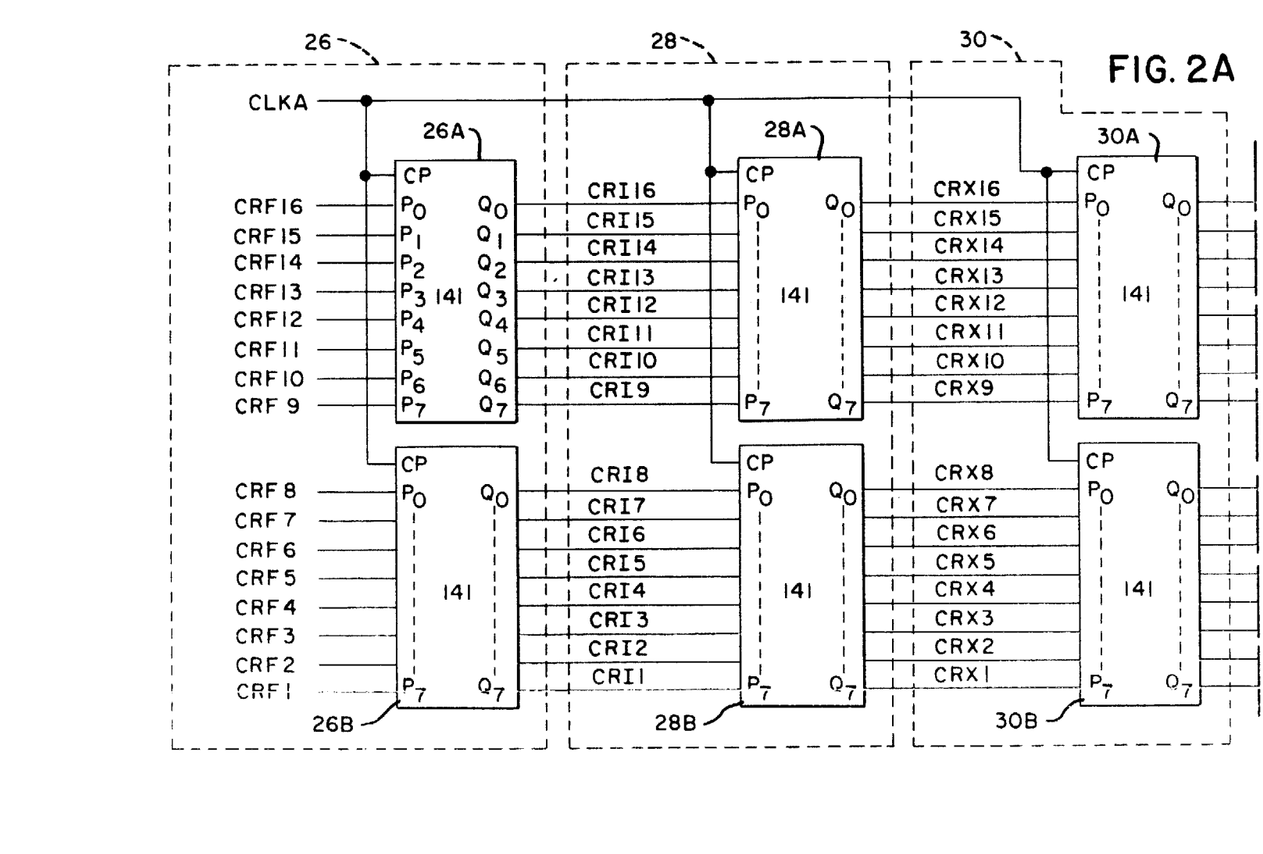
FIGS. 2A through 2I are a detailed block diagram of the diagnostic circuitry of FIG. 1.

Referring to FIG. 2A, there is shown the INTERPRET control register 26, the EXECUTE control register 28 and the EXECUTE+1 control register 30. As can be seen, control register 26 is comprised of two registers 26A and 26B, control register 28 is comprised of two registers 28A and 28B, and control register 30 is comprised of two registers 30A and 30B.

Registers 26A and 26B receive the control store address bits (CRF1-CRF16) from the FETCH stage of the processor 10 and, in turn, provide their stored control store address bits (CRI1-CRI16) from the INTERPRET stage to registers 28A and 28B in the EXECUTE stage of the processor 10. The registers 28A and 28B in the EXECUTE stage in turn provide their stored control store address bits (CRX1-CRX16) to the registers 30A and 30B in the EXECUTE+1 stage of the processor 10. The registers 26A, 26B, 28A, 28B, 30A and 30B are each clocked by the main processor clock CLKA.

Figure 2B:
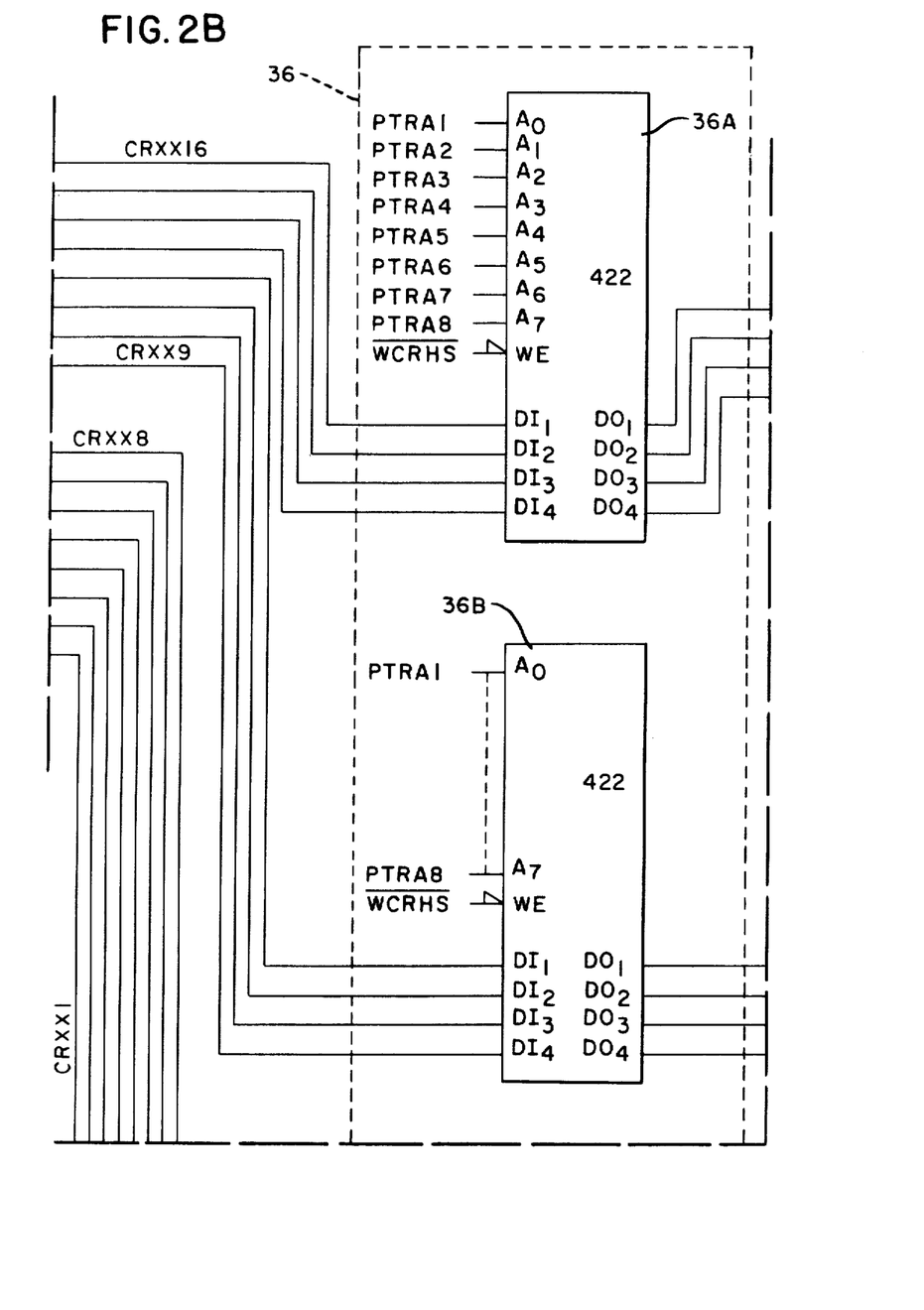
Figure 2C:
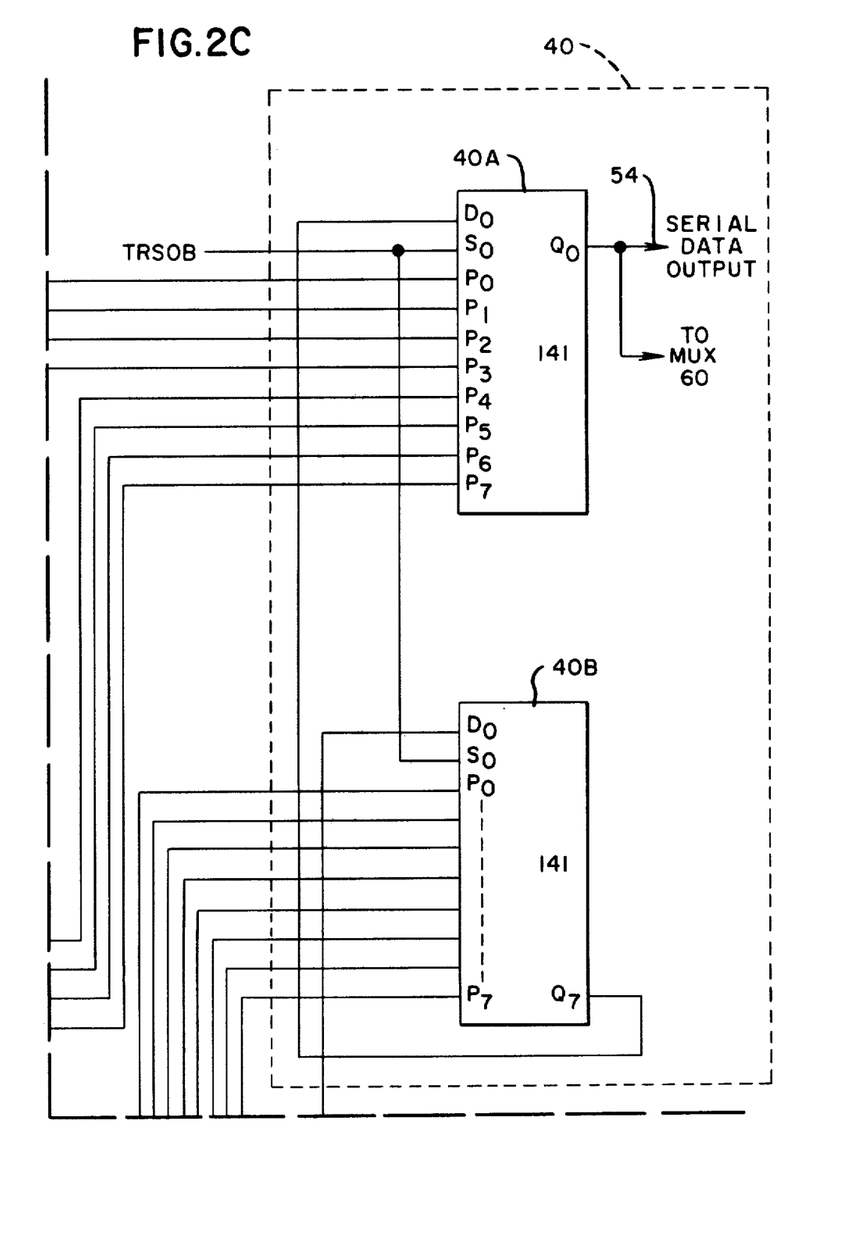
Figure 2D:
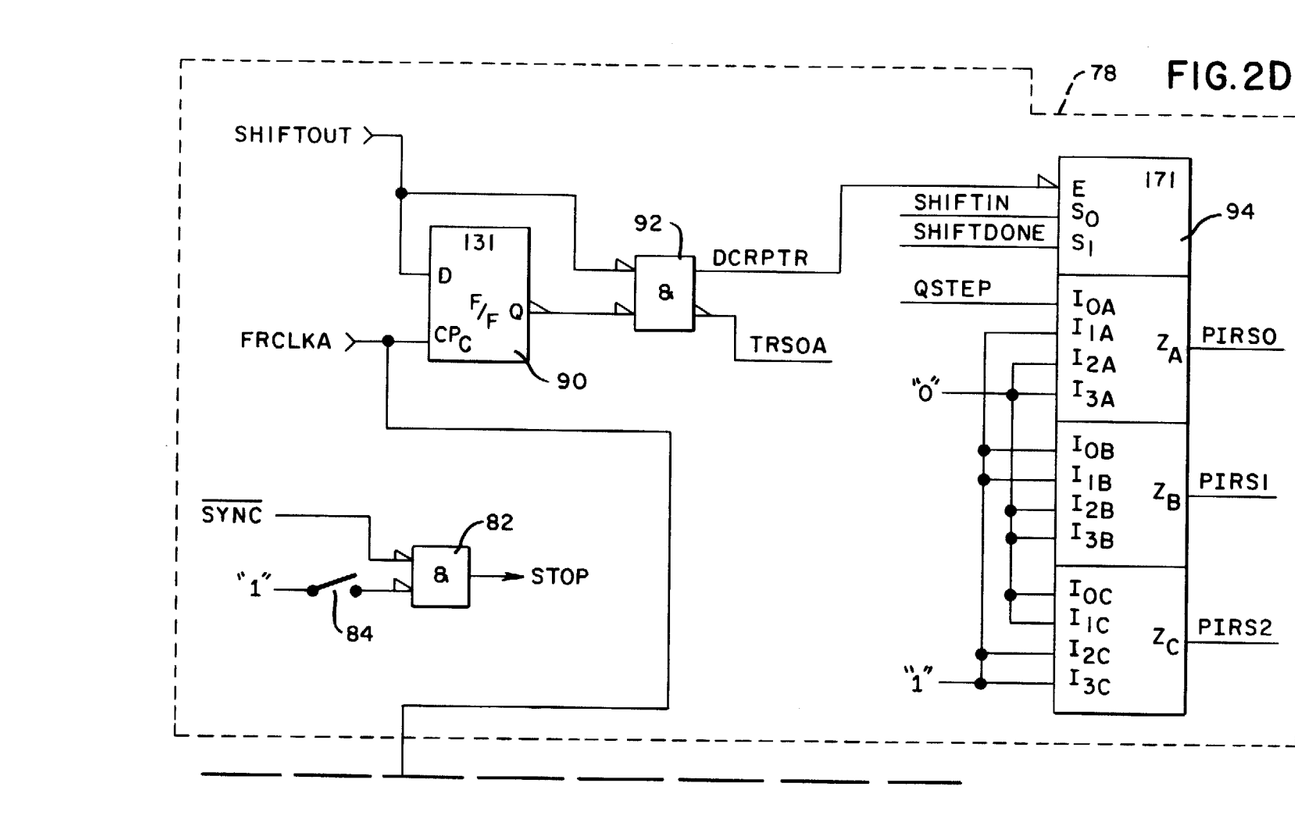
Figure 2E:
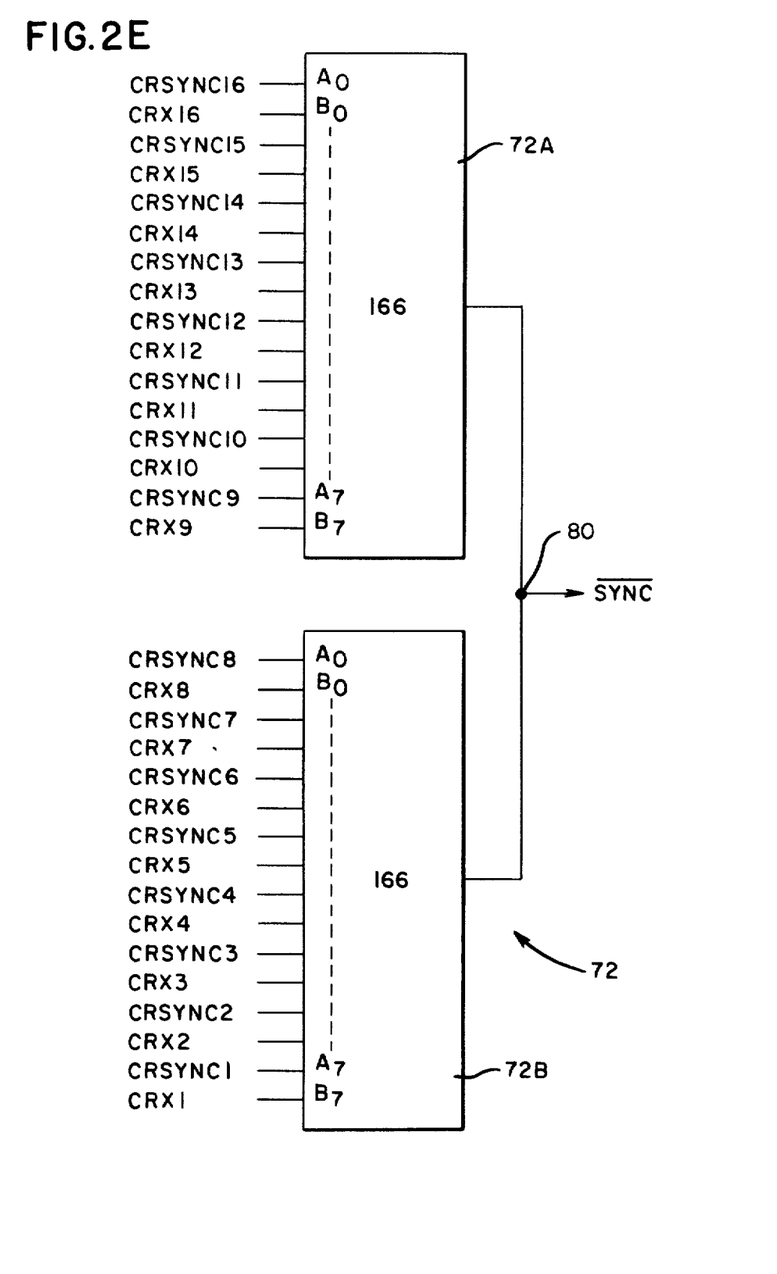
Figure 2F:
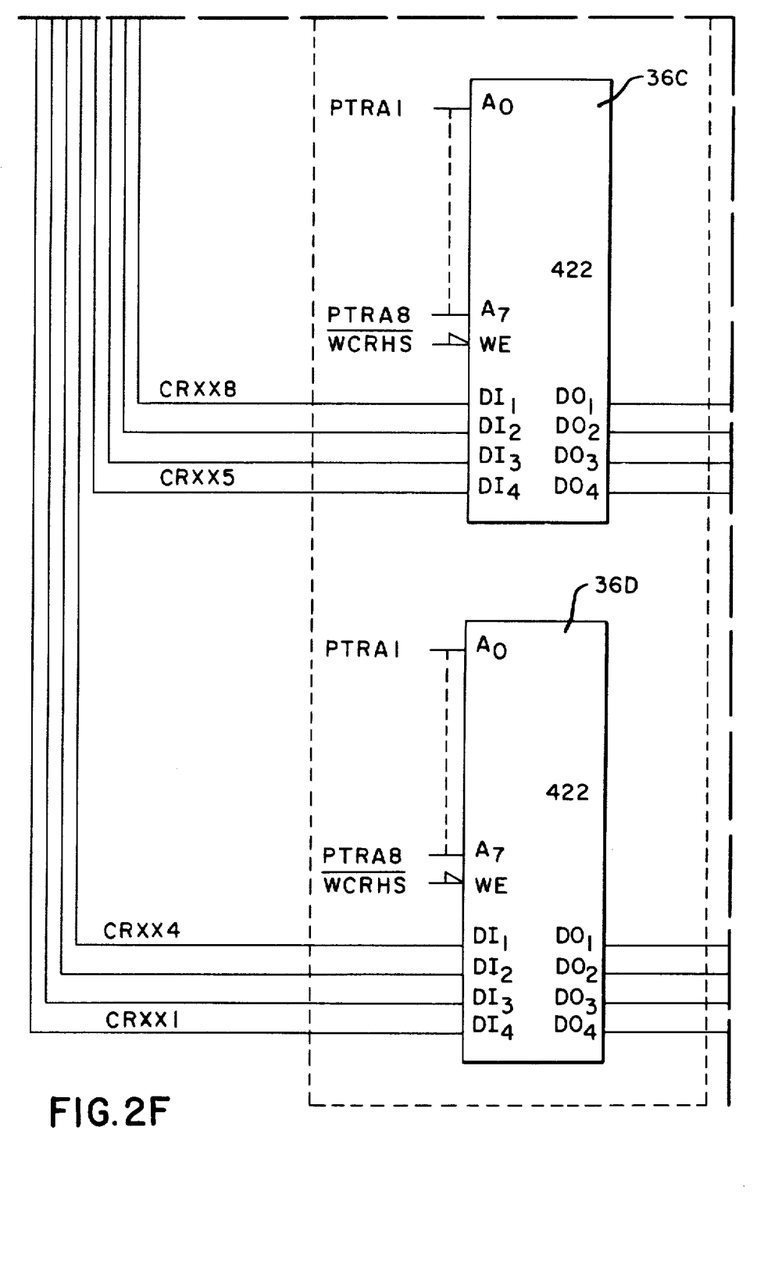

As seen in FIGS. 2B and 2F, the control store address bits (CRXX1-CRXX16) in the registers 30A and 30B of the EXECUTE+1 control register 30 are provided to the log 36. The log 36 is comprised of four LIFO memory devices 36A, 36B, 36C and 36D. The memory devices 36A-36D each receive eight log address bits (PTRA1-PTRA8) from the log pointer 38 (FIG. 2H) and in response to those log address bits, provide one of the control store addresses stored in the log 36 to the test register 40 (FIG. 2C). The memory devices 36A, 36B, 36C and 36D also each receive a control signal $\overline{WCRHS}$. The $\overline{WCRHS}$ signal is simply the previously mentioned main processor clock signal CLKA, inverted and slightly delayed. $\overline{WCRHS}$ synchronizes the reading and writing functions of the memory devices.

As seen in FIG. 2C, the test register 40 is comprised of two registers 40A and 40B. The output $Q_0$ of register 40A is provided to the serial data output 54 of the diagnostic circuitry 20, and to one input of the MUX 60 (FIG. 2I). The operation of the registers 40A and 40B is controlled by a control signal TRS0B.

The MUX 60 is shown in detail in FIG. 2I. The MUX 60 receives the SHIFTOUT signal at one control input and the SHIFTIN at its other control input. The $I_{0A}$, $I_{0B}$, $I_{1C}$, and $I_{2C}$ inputs of the MUX 60 are each provided with a "0" logic level signal, and the $I_{1B}$ and $I_{2B}$ inputs of the MUX 60 are each provided with a "1" logic level signal. The $I_{1A}$ input of MUX 60 receives the signal at the $Q_0$ output of register 40A in test register 40 (FIG. 2C), and the $I_{2A}$ input of MUX 60 is connected for receiving the data provided at the serial data input 56 of the diagnostic circuitry 20. The $I_{0C}$ input of MUX 60 receives a control signal TRS0A from the control logic circuit 78 (FIG. 2D).

Figure 2G:
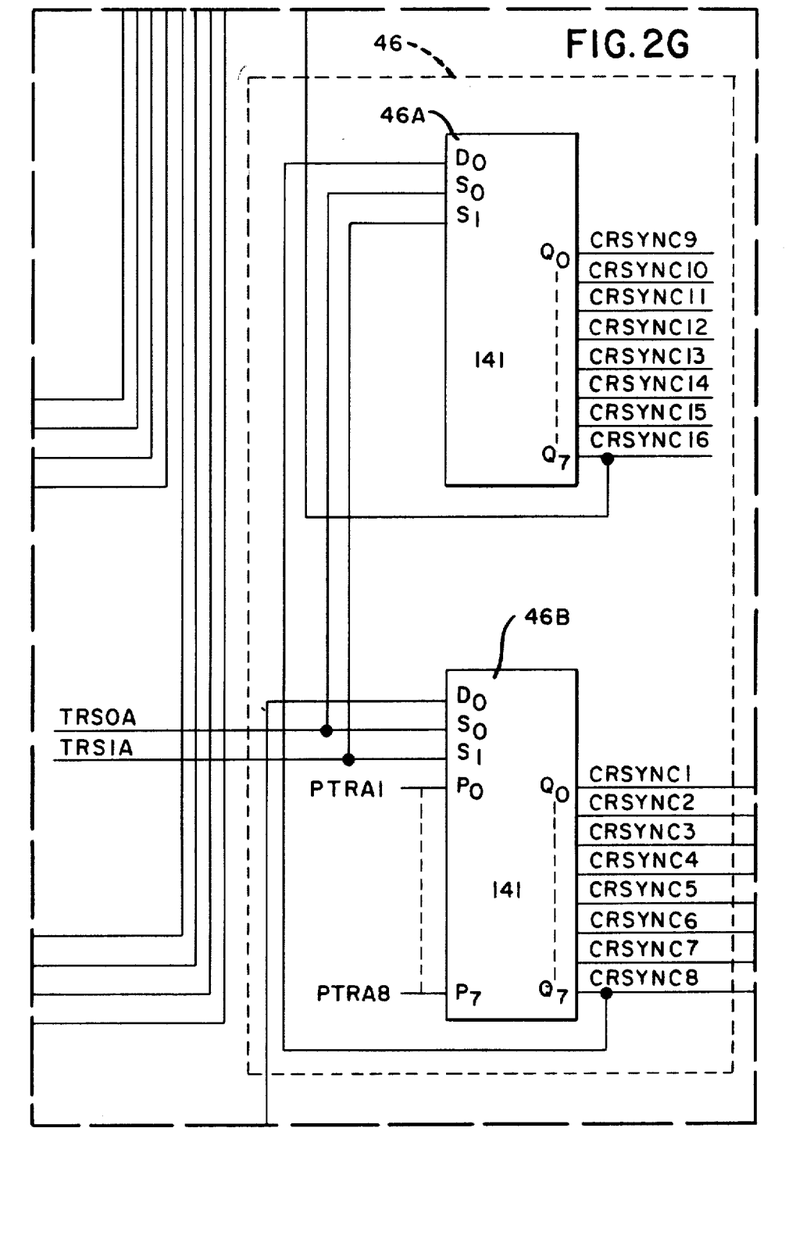

The output $Z_A$ of MUX 60 provides a signal TRDATAIN to the serial data input $D_0$ of test register 46 (FIG. 2G). The outputs $Z_B$ and $Z_C$ of MUX 60 provide control signals TRS0B and TRS1A. The TRS1A signal, along with the previously mentioned TRS0A signal, controls the operation of test register 46 (FIG. 2G) and the TRS0B signal controls the operation of the test register 40.

FIG. 2G shows the test register 46 as having two registers 46A and 46B. The control inputs of registers 46A and 46B receive the TRS0A and TRS1A signals. The parallel data inputs of register 46B receive the bits PTRA1-PTRA8 from the output of the log pointer 38. The $D_0$ serial input of register 46B receives the TRDATAIN signal from the output $Z_A$ of the MUX 60. The test registers 40 and 46 are cascaded, with the serial output $Q_7$ of register 46A connected to the $D_0$ input of register 40B (FIG. 2C).

The parallel outputs of the registers 46A and 46B in FIG. 2G provide bits (CRSYNC1-CRSYNC16) to one set of inputs of the compare circuit 72, seen in FIG. 2E. The compare circuit 72 is comprised of two compare circuits 72A and 72B, which have their outputs connected to a wired OR gate 80. The output of the wired OR gate 80 provides the previously mentioned $\overline{SYNC}$ signal. The compare circuits 72A and 72B compare the CRSYNC1-CRSYNC16 signals received from the parallel outputs of registers 46A and 46B (FIG. 2G) and the bits (CRX1-CRX16) received from the registers 28A and 28B of the EXECUTE control register 28 (FIG. 2A). $\overline{SYNC}$ goes to a zero logic level only if the CRSYNC1-CRSYNC16 signals and the CRX1-CRX16 signals match.

Figure 2H:
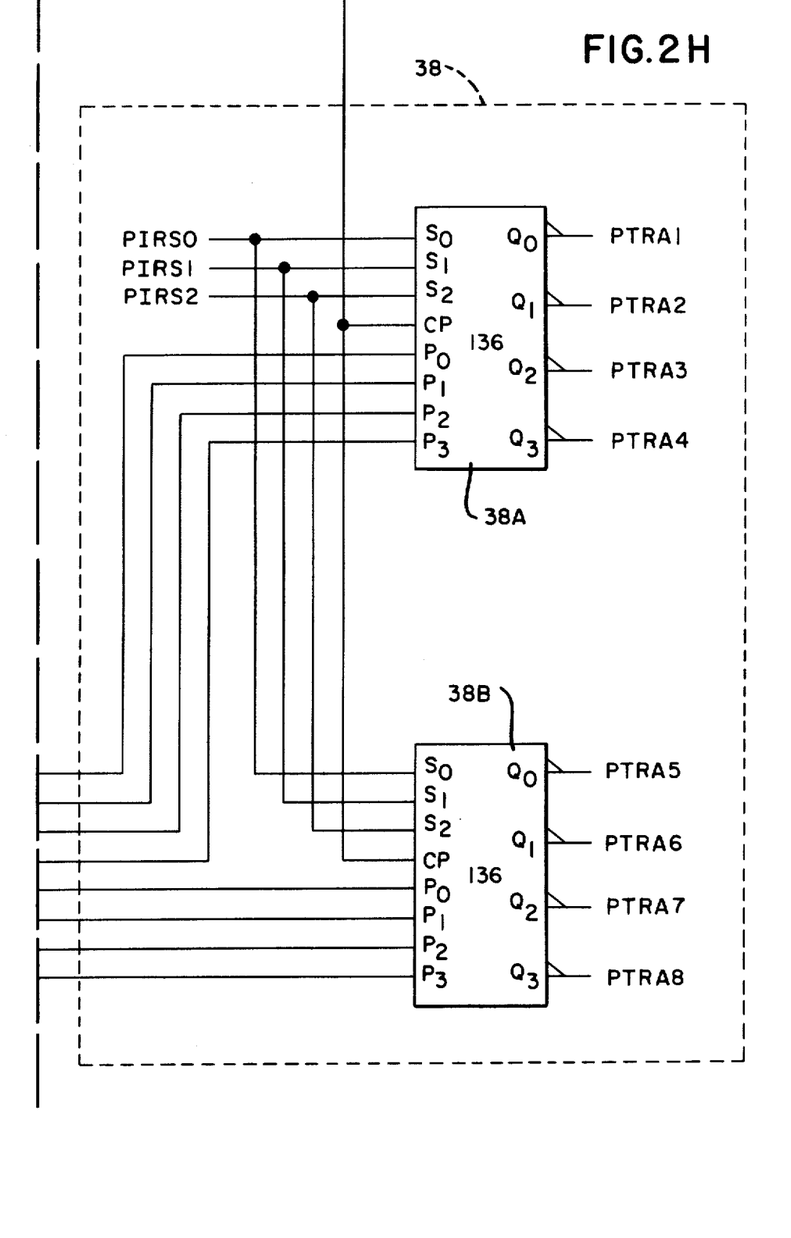
Figure 2I:
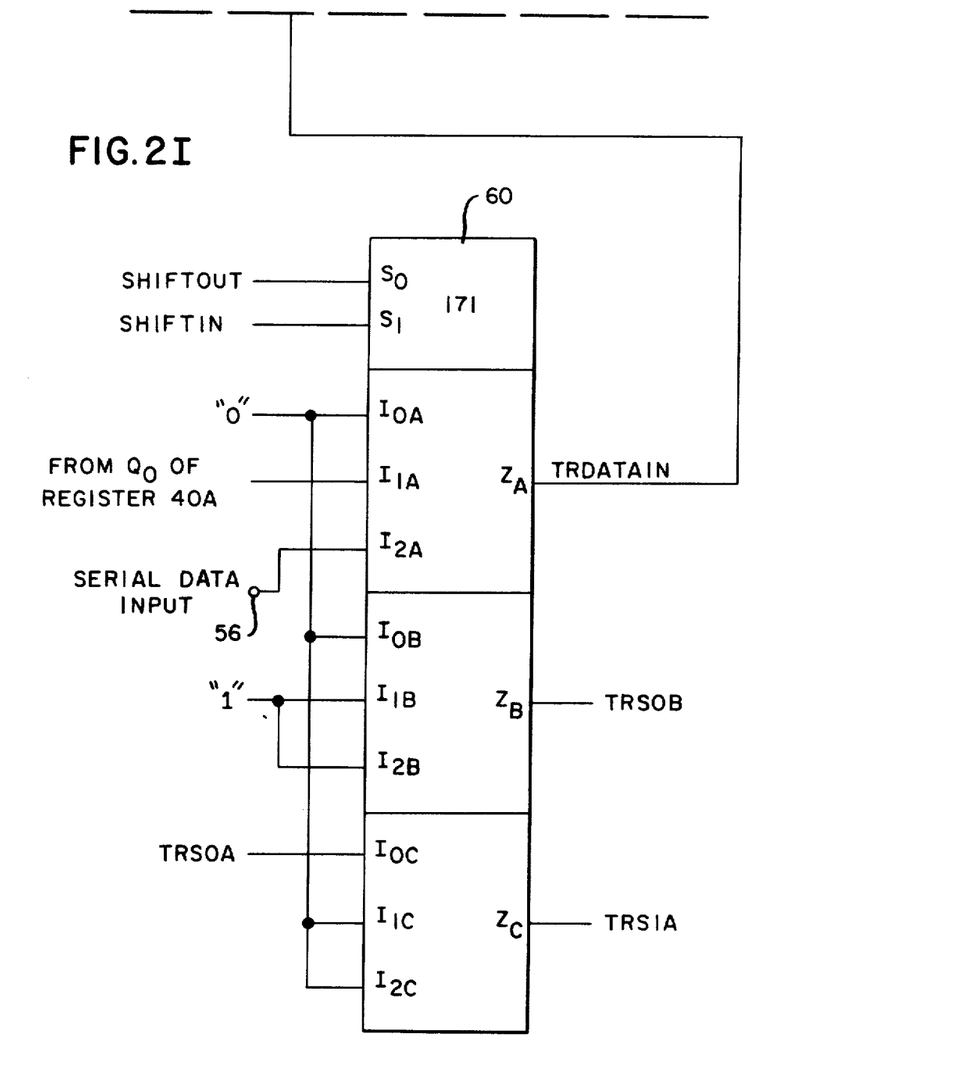

The log pointer 38 is seen in FIG. 2H. Log pointer 38 includes two counter/registers 38A and 38B, receiving at their control inputs control signals PIRS0, PIRS1 and PIRS2 and receiving at their clock input a clock signal FRCLKA (see FIG. 2D). The data inputs of the registers 38A and 38B are connected to receive the CRSYNC1-CRSYNC8 bits from register 46B (FIG. 2G) when the test register 46 loads a log address in the log pointer. The log address bits (PTRA1-PTRA8) at the output of the log pointer 38 are provided to the address inputs of the memory devices 36A, 36B, 36C and 36D of the log 36 (FIGS. 2B and 2F), and to the parallel data inputs of the register 46B in the test register 46 (FIG. 2G).

FIG. 2D shows in detail the control logic circuit 78 for controlling the operation of the diagnostic circuitry 20. As seen, the control logic 78 includes an AND gate 82 for receiving at one input the $\overline{SYNC}$ signal from the output of the compare circuit 78. The other input of the AND gate 82 is connected by way of a switch 84 to a "1" logic level signal. When the switch 84 is closed, the output of the AND gate 82 is always at a "0" logic level so that a STOP signal cannot be generated to stop the operation of the processor. When the switch 84 is opened, however, the $\overline{SYNC}$ signal, when generated at the output of compare circuit 72, will be passed through AND gate 82 in order to generate the STOP signal. The STOP signal can be used to stop the main processor clock CLKA.

The control logic circuit 78 also includes a flip-flop 90 for receiving the SHIFTOUT signal and a NAND gate 92 for also receiving the SHIFTOUT signal and receiving the output of flip-flop 90. The flip-flop 90 is clocked by the FRCLKA clock signal. FRCLKA is a free running clock which is identical in timing and frequency to the previously mentioned main processor clock CLKA. However, FRCLKA is not suppressed, for example, by the STOP signal, but rather runs without interruption.

The inverted output of NAND gate 92 provides the previously mentioned control signal TRS0A. The non-inverted output of NAND gate 92 provides a signal DCRPTR which, as will be more fully explained later, causes the log pointer 38 to decrement immediately after the bits in test registers 40 and 46 are shifted to the serial data output 54 by the SHIFTOUT signal. A MUX 94 in control logic circuit 78 receives the DCRPTR, SHIFTIN and SHIFTDONE signals at its control inputs. The $I_{0A}$ input of MUX 94 receives the QSTEP signal, the $I_{1A}$, $I_{0B}$, $I_{1B}$, $I_{2C}$, and $I_{3C}$ inputs are connected to receive a "1" logic level signal, and the $I_{2A}$, $I_{3A}$, $I_{2B}$, $I_{3B}$, $I_{0C}$, and $I_{1C}$ inputs are connected to receive a "0" logic level signal. The outputs of the MUX 94 provide the PIRS0, PIRS1, and PIRS2 signals that control the function or operation of the registers 38A and 38B of log pointer 38.

In operation, when the processor is running normally and the CLKA signal is causing control store addresses to be passed through to the EXECUTE+1 control register 30, and to the parallel data inputs of the log 36, the PIRS0, PIRS1 and PIRS2 signals at the output of MUX 94 are at "0,1,1," respectively, causing the registers 38A and 38B in log pointer 38 to increment as needed to store the control store addresses in the log 36.

When SHIFTOUT goes to "1," so that the control store addresses may be read from the log 36, the TRS0A signal at the output of NAND gate 92 goes to "1" and the TRS1A signal at the output of MUX 60 goes to "0" causing registers 46A and 46B of test register 46 to be placed in a shift mode. The TRS0B signal at the output of MUX 60 goes high, causing registers 40A and 40B of test register 40 to also be placed in a shift mode. SHIFTOUT stays at "1" for thirty-two clocks or pulses of FRCLKA in order to shift out all thirty-two bits from test registers 40 and 46. At the thirty-third clock, the DCRPTR signal at the output of NAND gate 92 goes to "1," causing the PIRS0, PIRS1 and PIRS2 signals at the output of MUX 94 to go to "0,0,1," respectively. The log pointer 38 is thereby caused to decrement to point to the next log address in the log 36. SHIFTOUT again goes to "1," repeating the shifting through the test registers and the decrementing of the log pointer as needed to sequentially read control store addresses from the log 36. As data is shifted out at serial data output 54, it is also passed back through MUX 60 to the $D_0$ input of register 46B.

If it is desired to provide a log address to the log pointer 38, in order to read the control store address from the log 36 at that log address, SHIFTIN goes to "1." The log address bits at the serial data input 56 are passed through MUX 60 to the $D_0$ input of register 46B in the test register 46. The TRS0A signal at the output of NAND gate 92 goes to a "1," and the TRS1A and TRS0B signals at the output of MUX 60 go to a "0," thereby placing registers 46A and 46B and registers 40A and 40B in a shift mode. When the thirty-second bit is shifted into test registers 40 and 46, the SHIFTDONE signal goes to "1," causing PIRS0, PIRS1 and PIRS2 at the output of MUX 94 to go to "0,0,0," respectively. Log pointer 38 is placed in a load mode, and the eight bits in register 46B are loaded into the registers 38A and 38B of log pointer 38. The log can then be read at the log address in the log pointer, in the manner described earlier.

When it is desired to load a control store address in test register 46, SHIFTIN goes to a "1," causing thirty-two bits at the serial data input 56 to be shifted into test registers 40 and 46 as described above. The sixteen bits (CRSYNC1-CRSYNC16) in registers 46A and 46B are held for comparison with the sixteen bits (CRX1-CRX16) from the EXECUTE control register 28 at the compare circuits 72A and 72B.

The circuit components shown in the drawings are all commercially available from Fairchild Camera and Instrument Corporation, Mountain View, Calif., and for ease in identifying the components, the last three digits of the circuit number for each are shown in FIGS. 2A-2I. More specifically, registers 26A, 26B, 28A, 28B, 30A, 30B, 40A, 40B, 46A and 46B may each be implemented by circuit no. F100141; memory devices 36A, 36B, 36C, and 36D by circuit no. F100422; multiplexers 60 and 94 by circuit no. F100171; flip-flop 90 by circuit no. F10131; comparators 72A and 72B by circuit no. F100166; and registers 38A and 38B by circuit no. F100136.

Although a presently preferred embodiment of this invention has been described, it will be understood that within the purview of this invention various changes may be made within the scope of the appended claims.

We claim:

1. In a data processing system having a processor for executing instructions, said processor having a control store for storing instructions and at least one control register for storing a control store address for addressing each instruction in said control store to be executed by said processor, the improvement comprising:
   a control register log having a plurality of storage locations and connected to said control register for receiving the control store address of instructions executed by said processor;
   a log pointer providing a log address and connected to said log for addressing each storage location in said log, said log pointer including means for incrementing the log address in order to sequentially address storage locations to store in said log each control store address of instructions executed by said processor;
   an external serial data output for providing the control store addresses in said log and the log address in said log pointer;
   a first test register having a serial input, a second input and a serial output; and
   a second test register having an input and having a serial output connected to the serial input of said first test register;
   said input of said second test register connected for receiving the log address in said log pointer, and said second input of said first test register connected for receiving the control store address in the storage location in said log addressed by the log address in said log pointer, said first and second test registers connected to said external serial data output through said serial output of said first test register in order to provide the control store address in said first test register and the log address in said second test register to said external serial data output.

2. The data processing system of claim 1, further comprising:
   means for loading said log pointer with an address of one of the storage locations in said log so that the signal at that storage location is read from said log.

3. The data processing system of claim 1, wherein said input of said second test register is a serial input, wherein the serial output of said first test register is connected to said external serial data output, and wherein the data processing system further comprises:
   an external serial data input; and
   a multiplexer having one multiplexer input connected to the external serial data input, a second multiplexer input connected to the serial output of said first test register, and a multiplexer output connected to a serial input of said second test register so that said second test register may receive bits from the serial output of said first test register and from the external serial data input.

4. The data processing system of claim 3, further comprising:
- a compare circuit having one set of inputs connected for receiving the control store address from said control register and a second set of inputs connected for receiving a control store address from said second test register, said compare circuit having an output signal indicating a match at the first and second sets of inputs.

5. In a data processing system having a processor with a plurality of pipelined stages and a control store for storing microinstructions to be passed through the stages in order to be executed in said processor, the improvement comprising:
- a control register associated with at least one of the stages, said control register for holding a control store address associated with the microinstruction in its associated stage;
- a last-in-first-out log having a plurality of storage locations and connected for storing the control store address of each microinstruction executed by the processor;
- a log pointer for providing a log address of each storage location in said log, said log pointer connected to said log so that the log address of a storage location is provided by said log pointer to said log when a control store address is to be stored in said log and when a control store address is to be read from said log;
- a first test register having a parallel data input connected for receiving the control store address stored in one of the storage locations in said log;
- a second test register having a parallel data input connected for receiving the log address provided by said log pointer and having a parallel data output;
- an external serial data output, said first and said second test registers interconnected, with a serial output of one of said first and said second test registers connected to said external serial data output so that a control store address in one of the storage locations in said log and the log address of that storage location in said log pointer are serially read from said first and second registers and provided at said external serial data output;
- a compare circuit connected for receiving data stored in said second test register from its parallel data output and for receiving the control store address of a microinstruction executed by the processor and held in the control register; and
- an external serial input connected for providing data in the form of a preselected control store address to said second test register so that when the microinstruction associated with the preselected control store address is executed by the processor, said compare circuit provides a signal indicating a match of the data in said second test register and the control store address of the microinstruction executed by the processor.

6. The data processing system of claim 5, wherein said log pointer has a parallel data input connected to the parallel data output of said second test register so that data in the form of a log address provided at said external serial data input to said second test register is in turn provided to said log pointer.

* * * * *